United States Patent Office 3,520,187
Patented July 14, 1970

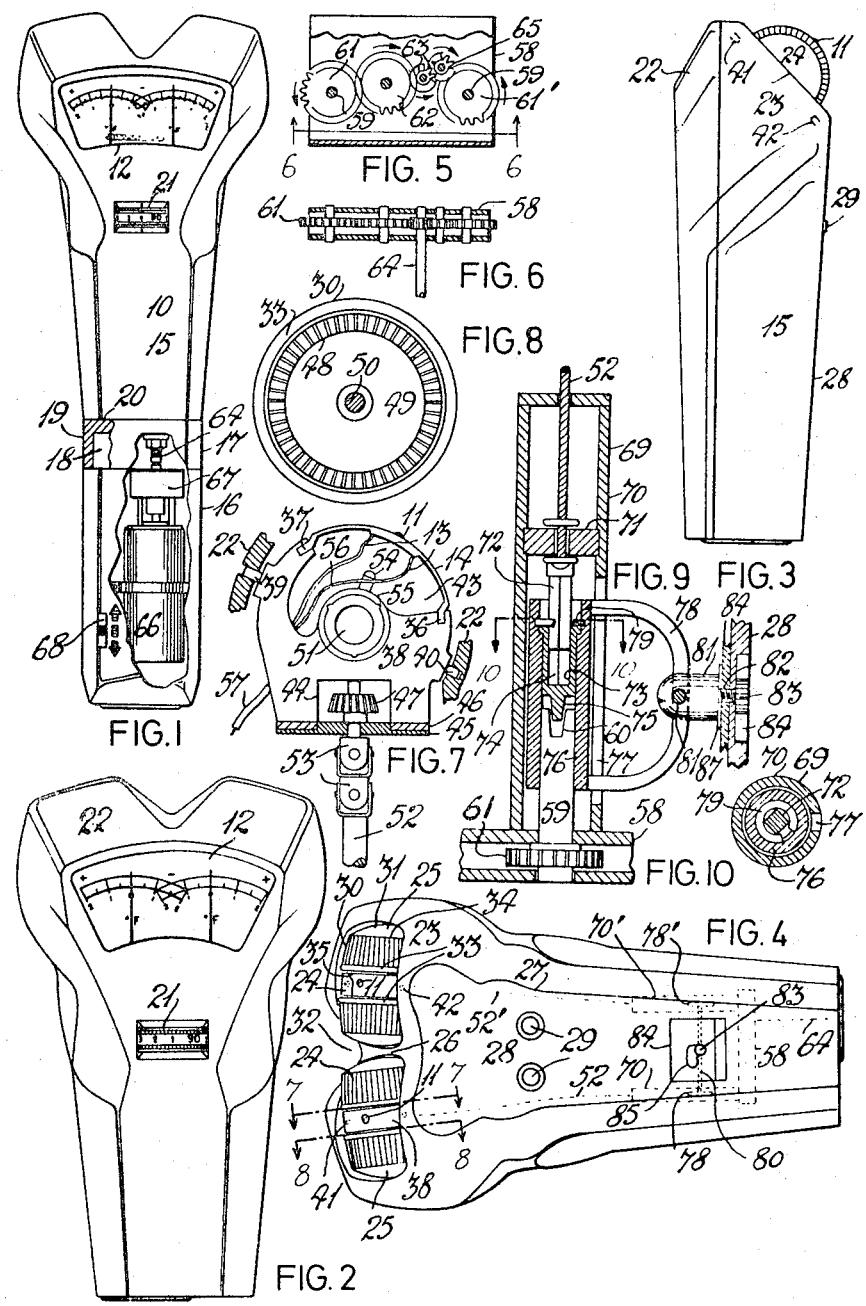

3,520,187
SKIN TEMPERATURE REGISTERING
ELECTRONIC THERMOMETERS
Andrew R. Petersen, Toronto, Ontario, Canada, assignor to Canadian Memorial Chiropractic College, Toronto, Ontario, Canada
Filed Aug. 17, 1967, Ser. No. 661,433
Int. Cl. G01k 7/22
U.S. Cl. 73—342
10 Claims

ABSTRACT OF THE DISCLOSURE

Device for analysis of skin temperature variations upon the length of the human spine and on either side of the paravertebral centerline for diagnostic purposes. Two thermistors are mounted separately, each in association with each of a pair of adjacent rollers. The rollers are driven by a motor through a gear train, clutch assemblies, cables and bevel gears. Each thermistor is mounted on a surface flanked by the two rollers. Two dial meters read out temperature as detected by the thermistors.

---

The present invention relates to a skin temperature registering and recording electronic thermometer having certain novel characteristics as hereinafter set forth, the principal purpose of the herein thermometer being an adjunctive aid in conducting one specific operation of neurological examinations.

More specifically stated, the herein invention is most particularly designed to indicate, on two direct reading galvanometers, two temperature sources spread apart approximately two inches. Even more particularly it is to be explained that the present invention is so adapted and designed as to facilitate rapid analysis of skin temperature symmetrically located on contralateral sides of the paravertebral area. Variations in skin temperature are used as an index of the normal integrity existing between the respective levels of neural control of thermo-regulation.

The herein disclosed thermometer is represented as a hand-held device which the practitioner employs by placing it symmetrically against the patient's spine usually while the latter is in the prone position, and moving it along the spine so that one of the roller means is on one side and the other is on the other side, of the line of the spinous processes constituted of the vertebrae projecting as a part of the vertebral column as a whole. As the device is so moved along the vertebral column differences in skin temperature are registered on two dials electronically connected to a pair of projecting, pin-point thermistors which bear against the skin and are set within mounts positioned between the rolling portions of said roller means, it being understood of course that the thermistors do not rotate with the said rolling portions but maintain constant skin contact during the movement of the device along the vertebral column as aforesaid.

No patentable novelty is claimed for the basic idea of a device movable along the vertebral column in the manner aforesaid, nor in a pair of roller means provided with the thermistors electronically connected to indicating dials by means of which variations in skin temperature can be observed.

What is novel about the present invention resides in the provision of particular and improved mounts or mounting means for the thermistors, whereby these and the immediately surrounding material of the mounts in which they are set, come in contact with the skin, will almost immediately approximate and assume the surface temperature obtaining at the successive points along the course over which the thermistors and mounts travel so that there will be no material lag in the recording of temperature changes by reason of the influence of the difference in temperature of the material of the mount immediately adjacent the thermistors, modifying the temperature of the thermistors. In this connection it will be appreciated that the temperature differences being described are liable to be extremely slight, and to differ from centimeter to centimeter along the course of travel of the device. In a word therefore, it is important that the thermistors should not be embedded in a massive, thick or solid mount, but, by contrast, should be set in or upon a mount which is of either thin cross-section between its external and internal surfaces, or else is of mesh construction, or else again is of a claw or spider construction. Of these, a curved plate of thin section has been deemed best and most suitable from practical points of view, with an air plenum to the rear of same, such plates being slightly spaced from the adjacent perimeter of the roller portions on either sides thereof, whereby a free current of cooling air may play upon the mounts. The material of the mounts also may vary, a plastic mount of plate form being presently deemed preferable although the patentee does not, of course, wish to be restricted as to material in any wise.

A further novel feature of the present device over previous devices for registering temperature along the contralateral sides or courses of the paravertebral area resides in the fact that the roller means are motor driven at a preset speed, the speeds of the two roller means being of course uniform. Novelty is also claimed for the provision in combination with the foregoing, of (i) a power source for so rotating the roller means within the device itself and (ii) for so conforming the skin contacting surfaces of the roller means such that slippage is eliminated, and a positive coefficient of friction achieved so that, under motor influence, the device will move along the vertebral column at a constant rate of speed, with the hand only being needed for guiding and supporting the portion of the device which is spaced from the thermistors and associated roller means.

In further development of the last preceding statement, it should be explained that when, as previously, spinal temperature registering instruments have been moved along the spine by hand, some practitioners may move the same too fast, and others too slowly, the latter of course being preferable. Nevertheless, a known and invariant speed permits the electronic transmission of the temperatures recorded to an adjacent recorder to which the hand-held device herein may be connected. Such recorder may include a tape onto which the temperature record may be impressed, usually visually, by well known means. No invention is claimed for the concept of connecting the herein described device to a recorder for such purpose.

Another feature of the present invention resides in the provision of the specific means within the hand-held device whereby both roller means may be rotated at a constant rate of speed as aforesaid, and in either direction. Novelty is also claimed for the feature which resides in the ability to disconnect or declutch the roller means from the aforesaid source of power which drives them in order that the practitioner may, if he prefers, move the device along the vertebral column under manual effort and at his own personally preferred rate of speed rather than that which is governed by the said source of power.

A further object of the present invention is to provide a device of the character herewithin described which is conspicuously simple and easily adjusted so that the same may be made available to practitioners at economically acceptable rates and by means of which, the measurements of spinal temperature may be collected, analysed and put into medically useful statistical form for diagnostic and clinical purposes.

With the foregoing considerations in view, and such other objects, purposes or advantages as may become apparent from consideration of this disclosure and specification, the present invention consists of the novel concept exhibited in the method, process, construction, arrangement of parts, or new use of any of the foregoing herein particularly exemplified in one or more specific embodiments of such concept, reference being had to the accompanying figures in which:

FIG. 1 is a front elevation of the present hand-held device, partially fragmented to illustrate the location of its source of power.

FIG. 2 is an enlarged representation of the upper portion of FIG. 1.

FIG. 3 is a side elevation of the upper portion of FIG. 1 as viewed from the right hand side of FIG. 1.

FIG. 4 is an elevation similar to FIG. 2 but as the same would appear upon the reverse side thereof, and if rotated 90° counterclockwise.

FIG. 5 is a sectional plan representation of the gear box and contents thereof by means of which the roller means are caused to rotate in the same direction and at the same rate of speed.

FIG. 6 is a section on the line 6—6 of FIG. 5.

FIG. 7 is a section on the line 7—7 of FIG. 4.

FIG. 8 is a section on the line 8—8 of FIG. 4.

FIG. 9 is a longitudinal or cross sectional elevation of the independent means employed for effecting operating connection and disconnection between the roller means hereof and the source of power.

FIG. 10 is a section on the line 10—10 of FIG. 9.

In the drawings, like characters of reference, designate similar parts in the several figures.

First to summarize the present inventive concept, the same comprises a device adapted and designed for (a) movement along a pair of courses upon either side of the line of the central spinal process (though without restriction thereto, or even to medical use), at different points upon the length of which the surface temperature may vary, (b) responding to the temperature at such two different points, and (c) indicating the temperature of each point individually and simultaneously, the said device embodying: (i) a casing collectively designated 10, (ii) temperature responsive means in the form of a pair of pin point thermistors 11, (iii) temperature indicating means collectively designated 12, and (iv) temperature response transmitting means generally designated 13 between said temperature responsive means and said temperature indicating means, characterized in that said temperature responsive means take the form of the thermistors aforesaid when set in mounts generally designated 14 so as to project slightly outward therefrom, with the mounts being so constructed and designed, and formed of such material as almost immediately to approximate, assume and absorb the surface temperature obtaining at successive points along said courses, as those parts of said mounts which are immediately adjacent and surrounding said thermistors touch the surface of said courses adjacent said points, so that the temperature differential of the mounts will not materially influence or cause lag in the response of the thermistors as they are moved along the aforesaid temperature-variable courses.

Having regard to the aforesaid summary and indication of the scope of the present invention already set forth, a more detailed description follows.

The casing 10 is preferably though not necessarily formed of plastic and consists of an upper portion generally designated 15 and a separable lower portion 16 separated from portion 15 by the intervening collar portion 17. The collar is optional and adapted and designed particularly to embrace the reduced upper end portion 18 of lower portion 16, the same comprising a surrounding wall 19 and a cover portion 20 which abuts the lower closed end of portion 15, it being understood that through such closed end and the portion 20, extends the socket by means of which the circuitry (not a part of the invention) within casing portion 15 is contained, in considerable part for the purpose of transmitting temperature data from the thermistors 11 to an adjacent recorder, and also for permitting the drive shaft from the motor within lower casing portion 16 to pass therethrough, or for the purpose presently to be described.

The adjustable knurled wheel 21 is for a purpose not connected with the novelty of the present invention for which reason same will not be described. The upper region 22 of the upper portion 15 of casing 10 is of the configuration clearly depicted in the accompanying FIGS. 1 through 4, and from FIGS. 3 and 4 it will be discerned that upon the generally opposite side, and inclining portion 23 of the casing portion 15, a pair of roller means collectively designated 24 project through apertures 25 divided by a thin land 26. The area depicted in FIG. 4 bounded by the line 27 is to be understood as generally representing the flat surface 28 (see FIG. 3) whereby the device may be laid firmly upon a flat horizontal surface, while numerals 29 represent on-off buttons which again form no part of the present invention.

Each of the roller means 24 consist of a pair of outer, spaced, roller portions 30 having an annular surface which is slightly convexly frusto-conical so as to taper slightly outwards towards the domed end-portions 31. The annular surfaces of the roller portions have a superficial conformation such as will increase the co-efficient of friction between same and the surface (usually the skin surface) on either side of the centreline of the vertebral column (which centreline incidentally will lie, generally speaking, upon the centreline of trough 32). The superficial conformation referred to may desirably consist of simple knurling as clearly depicted in the accompanying FIG. 4.

Each of the rollers, or roller means, or assemblies, collectively designated 24, should also (collectively considered) be said to have a generally ovoid surface about the major axis thereof, as again will be most clearly apparent from the accompanying FIG. 4. Accordingly the diameter of the inner edges or rims 33, will be slightly greater than the outer edges 34 of each roller or rolling portion 30. The mounts or mounting structures generally designated 14 are positioned between the rolling portions 30 and by reference particularly to FIG. 4 it will be observed that a slight annular space 35 is provided upon either side of the mounting structure 14 to permit air to enter between it and the inner edge 33 as will presently be more fully referred to.

The mountings or mounting structures 14, in the form of curved plates of thin section between the outer convex and inner concave surfaces thereof, are secured at the ends 36 and 37 in a centre-assembly collectively designated 38 of the configuration most clearly depicted in the accompanying FIG. 7 from which the same will be seen to have a major surface portion which is circular and approximately co-terminous with edges 33. The centre assembly is also provided with a pair of diametrically opposite and angularly disposed projecting trunnions 39 and 40 projectable into the shown apertures in the upper casing region 22, or in other words, where approximately indicated by the phantom lines 41 and 42 in the accompanying FIGS. 3 and 4 so that the rollers (or roller assemblies) collectively considered 24 may swivel to a limited extent about said trunnions.

Behind the mount or plate 14 a plenum 43 of substantial volume is provided in which air may circulate behind the plate, the same entering and exiting through the annular slots 35 aforesaid. The base of the centre assembly 38 is flat, provided with the aperture 44, and closed by the plate 45 and pair of shims 46, the former of these two parts functioning as a bearing for the bevel gear 47. This gear is in mesh with the bevel ring gear 48 facing the shown surface of the centre assembly 38 (see FIG. 7). In other words, ring gear 48 is so secured within one of the roller portions 30 such that the teeth 49 thereof are more or less co-incident with the inner edges 33. Preferably, though not necessarily, the bevel ring gear 49 is secured to the inner roller portion of each roller assembly 24.

It is to be understood that the bevel gear 48 rotates the roller portions 30 of the assembly 24 within which it is located, and that the two roller portions 30 thereof are connected for rotation in unison in virtue of the through-shaft 50 which traverses the central aperture 51 in assembly 38 which assembly, although rotatable about the trunnions 39 and 40, is fixed and non-rotatable about the axis of shaft 50.

Extending downwardly from each of the bevel gears 47 is a rotation-imparting flexible cable 52 or 52' (see FIG. 4). To compensate for the swivelling action of the rollers or rolling assemblies 24 as they move over the patient's back, a pair of universal couplings collectively designated 53 is interposed between each of the aforesaid cables and the adjacent bevel gear stub shaft associated with gear 47. A small upstanding L-shaped fitment 54 projects from the hub 55 of centre assembly 38 to receive one of the pair of leads 56 from thermistor 11 so as to maintain these well separated within the plenum 43. The leads 56 may if desired emerge as a pair 57 to proceed downwardly within the upper casing portion 15.

The cables 52 and 52' extend downwardly to the shallow horizontally disposed and plate-like gear box generally designated 58 being interrupted in their passage by the clutch means depicted in FIGS. 9 and 10 which will be described hereinafter. Assuming at this point therefore that the cables extend directly downward through the aforesaid gear box 58, it will be understood that an upstanding shaft 59 having a female keyed upper end 60 is operatively connected to cable 52, the said shaft 59 being secured for rotation with a spur gear 61. Similar arrangements exist with respect to the cable 52', the lower end being operatively connected with the spur gear 61 of similar diameter to gear 61'.

In mesh with gear 61 is a third spur gear 62 of similar diameter to gears 61 and 61'. In mesh with gear 62 is a small spur drive gear 63 connected to drive shaft 64. In mesh with drive gear 63 is an idler gear 65 of similar diameter to gear 63. Gear 65 is also in mesh with gear 61'.

It follows from the foregoing arrangement of five gears, the first three of similar large diameter and the last two of similar and smaller diameter, that motor 66 within the lower portion 16 and casing 10 can, through the conventional gear-reduction assembly 67 drive the roller assemblies 24 both in the same direction and at uniform speed. This can be effectuated as to clockwise or counterclockwise motion so that the device may be made to crawl up or down the spine in virtue of the conventional two-way switch assembly 68 the details of which need not be set forth. It will be noted that in the accompanying FIG. 1, 64 designates the shaft connecting motor 66 to gear box 58. In fact of course the shaft 64 is separable at this point since it has already been stated that lower casing portion 16 may be separated from upper casing portion 15. This is however effected by a simple interlocking key arrangement of conventional form which again it is therefore not deemed necessary to illustrate.

The means collectively designated 69 and depicted in the accompanying FIGS. 9 and 10 for operatively disconnecting the rollers or roller assemblies 24 from motor 66 (and gear box 58) comprise a pair of sleeves 70 and 70' (see FIG. 4) the lower ends of which are secured to the upper plate of gear box 58. The lower ends of cables 52 extend through the capped upper ends of outer sleeves 70 and 70' to terminate in the bushing 71 key-set or otherwise against longitudinal movement as clearly depicted in FIG. 9. Below the bushing 71 is a squared extension 72 of the cable 52, same being free to rotate within an inner sleeve 73 having a complementarily squared inner recess 74 slidably to accommodate portion 72, the lower end of sleeve 73 being provided with a male portion 75.

Surrounding the inner sleeve 73 is an intermediate sleeve 76 within which shaft 59 extends. Projecting from the upper and lower ends of each of the sleeves 76, and through slots 77 in sleeves 70 and 70' is a clevis 78 and 78'. Slots 77 are sufficiently long to permit limited vertical movement of the aforesaid clevises (and of course the sleeve 76) within the outer sleeve 70 and 70'.

Inner sleeves 73 are ring-keyed or otherwise, as at 79 against independent longitudinal movement within outer sleeves 76 although sleeves 73 may freely rotate since integral with cables 52. It follows from the foregoing that when the clevises 78 and 78' are moved, as a pair, downwardly the male end 75 of sleeve 73 will engage the female upper end 60 of shaft 59 and as a consequence the roller assemblies 24 will be in clutched connection with the contents of gear box 58 and specifically spur gears 61 or 61'. When the clevises 78 and 78' are moved as a unit to the upper limits of slots 77, clearly shafts 59 and cables 52 will be disconnected via the inner sleeves 73 and the male/female connections between them.

The clevises 78 and 78' may be moved as a unit since the two are cross-connected by the transverse bar 80 which extends through the enlarged boss 81. Projecting from the said boss is a screw threaded extension 82 to the outer end of which a knurled knob 83 is attached. This knob resides in a square recess 84 formed in the thickness of the flat back portion 28 of casing portion 15, and as will be noted from FIG. 5, lies flush with the outer surface of the casing. The screw threaded shank portion 82 moves in an L-shaped recess 85 extending through the thickness of the casing, parts 86 and 87 simply constituting a backing plate and a washer respectively.

Boss 81 is free to slide transversely on cross bar 80. As a result of the foregoing arrangements, it will be apparent that, with reference to the accompanying FIG. 4, if the knob or buttons 83 be pushed leftwardly, bar 80 will cause the U-shaped clevises 78 and 78' to rise and effect a declutching action. If then the knib 83 be moved downwardly (again with reference to the accompanying FIG. 4) the aforesaid declutching action will be locked. Furthermore, the screw threaded knob 83 may be tightened, and thus the declutched relationship positively maintained. By a simple reverse of the aforesaid action, the roller assemblies 24, may be brought into positive and locked clutching engagement with motor 66 via gear box 58.

Various modifications can be made within the scope of the inventive concept disclosed. Accordingly, it is intended that what is set forth herein should be regarded as illustrative of such concept and not for the purpose of limiting protection to any particular embodiment thereof, and that only such limitations should be placed upon the scope of protection to which the inventor hereof is entitled, as justice dictates.

What is claimed is:

1. A device adapted and designed for (a) movement along a pair of courses at different points upon the length of which the surface temperature may vary, (b) responding to the temperature at said different points, and (c) indicating the surface temperature of each course individually and simultaneously, said device embodying (i) a casing, (ii) temperature responsive means, (iii) temperature indicating means and (iv) temperature response transmitting means between said temperature responsive means and said temperature indicating means, characterized in that said temperature responsive means takes the form of a pair of thermistors, and mounts for said thermistors, said thermistors being so set in said mounts as to project slightly outwards therefrom, said mounts being so constructed, designed, and formed of such material, as almost immediately to approximate and assume the surface temperature obtaining at successive points upon and along said courses as those parts of said mounts which are immediately adjacent said thermistors touch said points, so that the temperature differential of said mounts and points will not materially influence or cause lag in the response of said thermistors as they are moved along said temperature-variable courses, a pair of rollers in the vicinity of said thermistors, and a source of power for rotating said rollers at a predetermined rate of rotation so as to ensure a constant rate of movement of said device along said courses.

2. The invention according to claim 1 which is further characterized in that said mounts are each in the form of a curved plate of thin section between the convex and concave surfaces thereof, said thermistors projecting from the convex sides of said plates, and a source of power for rotating said rollers at a predetermined rate of rotation so as to ensure a constant rate of movement of the device along said course.

3. The invention according to claim 1 which is further characterized by the provision of a superficial conformation of said rollers such as will increase the co-efficient of friction between said rollers and the surface of said course and thereby promote constancy in rate of travel due to absence of slippage.

4. The device according to claim 1 in which said rollers are separate, spaced, and capable of independent swivelling action, the invention being further characterized by the provision of means for driving said rollers at uniform speed in a similar direction, from a single source of power.

5. The invention according to claim 1 which is further characterized by the provision of a superficial conformation of said rollers such as will increase the co-efficient of friction between said rollers and the surface of said course and thereby promote constancy in rate of travel due to absence of slippage, and which is still further characterized in that said rollers are separate, spaced, and capable of independent swivelling action, and in that means are provided for driving said rollers at uniform speed in a similar direction from a single source of power.

6. The device according to claim 1 which is hand-held and which is characterized in that said source of power is positioned in said hand-held device.

7. The invention according to claim 1 characterized in that said source of power is reversible to reverse the direction of travel of said rollers.

8. The invention according to claim 1 characterized by including means for operably disconnecting said rollers from said source of power.

9. The device according to claim 1 in which said rollers each include roller assemblies each embodying an inner and an outer rolling portion, and in that said thermistors are positioned between said inner and outer portions, each of said roller assemblies having a generally ovoid surface about the major axis thereof, so as to have a superficial conformation such as will increase the co-efficient of friction between it and the surface of said course, said two rolling portions being co-axially connected for unitary rotation and spaced apart by a center-assembly, the major portion of the surface of said center assembly being circular and approximately co-terminous with the inner ends of said rolling portions, said roller assemblies being independently swivelled by the provision of a pair of diametrically opposed trunnions and co-operating recipient apertures extending between said center assembly and the adjacent material of said device, a bevel ring-gear in one of said rolling portions of each of said roller assemblies, a bevel gear in mesh therewith journalled in said center assembly for driving said ring gears about said co-axial connection between said rolling portions.

10. The invention according to claim 1 in which said rollers include roller portions having roller surfaces with a superficial conformation such as will increase the co-efficient of friction between said roller portions and the surface of said courses and thereby promote constancy in rate of travel due to absence of slippage, each of said mounts being of thin section between the exterior and interior surfaces thereof, and positioned between the roller portions of one of said rollers. an air plenum existing to the rear of each of said mounts, and an air space between each mount and at least one of said roller portions adjacent thereto, capable of permitting air circulation within said plenum, and to the rear of said mounts.

References Cited

UNITED STATES PATENTS 2,661,733 12/1953 Polsky _____ 73—341
2,900,820 8/1959 Serafin _____ 73—342

FOREIGN PATENTS 149,600 11/1961 U.S.S.R.

LOUIS R. PRINCE, Primary Examiner

D. E. CORR, Assistant Examiner

U.S. Cl. X.R.

73—351; 128—2.1